Nov. 29, 1949     I. W. COX     2,489,753
APPARATUS FOR HEATING GRANULAR MOLDING MATERIAL
Filed June 2, 1945
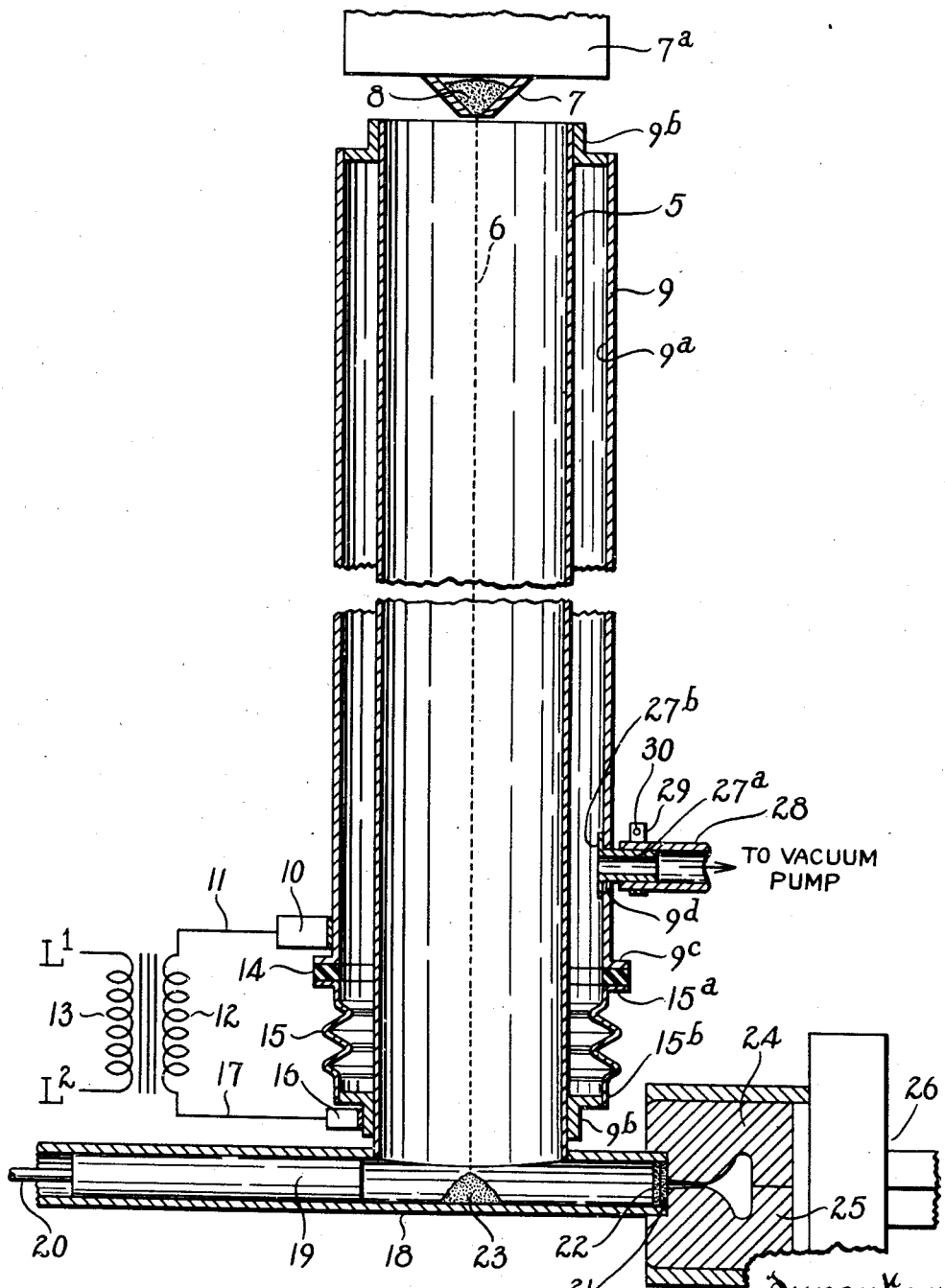
Inventor
Orvin W. Cox
By Frank H. Hubbard
Attorney Patented Nov. 29, 1949

2,489,753

UNITED STATES PATENT OFFICE 2,489,753

APPARATUS FOR HEATING GRANULAR MOLDING MATERIAL

Irvin W. Cox, West Allis, Wis., assignor to Cutler-Hammer, Inc., Milwaukee, Wis., a corporation of Delaware Application June 2, 1945, Serial No. 597,322

4 Claims. (Cl. 219—36)

This invention relates to an improved method of and apparatus for heating granular molding material.

An object of the invention is to improve and simplify the heating of granular material of the character employed in transfer molding devices.

Another object is to facilitate heating of such granular material to a predetermined proper or desired temperature just prior to introduction thereof into the transfer molding device.

Another object is to provide for heating of a continuous stream of such granular molding material during its fall by gravity through a space of predetermined length.

Another object is to minimize the time required for heating of such granular molding material, so that thermosetting material may be molded at an elevated temperature before it reacts or sets.

Another object of the invention is to provide a heating apparatus of the aforementioned character comprising an inner metal tube of relatively thin cross section having the desired resistance characteristics.

Another object is to provide a heating apparatus having such an inner tube and an outer tube composed of relatively heavy gauge copper; said tubes being electrically connected with each other at one end thereof and mechanically connected but electrically insulated from each other at the other end thereof, whereby a suitable space is provided therebetween.

Another object is to provide for sealing of said space between the inner and outer tubes, and to provide for creation of a vacuum within said space to insulate it thermally and provide for economical heating, while affording a flexible connection between said tubes to compensate for the greater degree of expansion of the hot inner tube with respect to the outer copper tube.

Another object is to provide for use of an inner tube having a high temperature coefficient of resistance, whereby the same becomes self-protecting when heated to the proper temperature by electric current from a constant voltage source.

Another object is to provide for electrical connection of the lower ends of the respective outer and inner tubes to the secondary terminals of a transformer, such as that employed for welding.

Other objects and advantages of the invention will hereinafter appear.

The accompanying drawing, consisting of a single figure, illustrates somewhat schematically and diagrammatically a heating apparatus embodying the present invention.

It is to be understood that the term "granular" employed herein and in the claims is intended to include molding materials of the aforementioned character of either granular or flake form, or materials in the form of powders of various degrees of fineness. However, the preferred form is a dust-free, pre-granulated material with the granules of spheroidal form and somewhat less than rice size. One type of thermoplastic and thermosetting molding material adapted for treatment in accordance with my invention is the phenol-formaldehyde condensation product sold commercially under the trade-name of "Bakelite," either alone or including a suitable proportion of fibrous or other type of filler.

As is well understood, such molding material must be heated to the proper degree to insure proper plasticity thereof for flow or transfer thereof to the molding cavity; it being necessary to insure that transfer be effected almost immediately after the molding material has attained the proper temperature, and prior to setting or curing thereof, which must take place in the mold cavity or cavities.

In the drawing, illustrating a presently preferred form of heater embodying my invention, the numeral 5 designates the inner metal tube of relatively thin cross section having the desired resistance characteristics. Tube 5 is preferably of circular form in transverse cross section, and of approximately three inches in diameter.

It is contemplated that the granular molding material shall be supplied or poured in a thin stream, represented diagrammatically by the dotted line 6, from a suitable feeding device or hopper such as that shown at 7; a quantity of granular material being shown in the hopper and designated by numeral 8. If it is desired that only a sufficient quantity of the granular molding material shall be heated as will provide the proper charge to be transferred to a single molding die (or simultaneously to a connected group of molding dies), I prefer to provide a device such as that shown diagrammatically at 7ª, which device may embody suitable means (not shown) to weigh and feed to hopper 7 the proper quantity of material to form a charge for the aforementioned molding die or dies, as hereinafter more fully described.

The arrangement is such that the granular molding material will be brought to molding temperature during the short period (slightly more than one second of time) required for the same to fall through the tube 5. Although only the upper and lower fragments of tube 5 are illustrated, it is to be understood that the same will preferably be of a length of approximately sixteen feet. In practice tube 5 will preferably be of seamless form throughout its length, and composed of stainless steel, nickel or Nichrome. I prefer that tube 5 shall be composed of one of the aforementioned materials having a high temperature coefficient of resistance, inasmuch as a tube composed of such a material can become self-protecting when heated to the proper temperature.

The outer tube 9, which is preferably composed of relatively heavy gauge copper, is of only slightly less length than tube 5 so as to surround the latter throughout the major portion of its length. Tube 9 is also preferably of seamless form, and its inner surface $9^a$ should be as highly polished as possible, since it is intended to act as a reflector for heat rays emanating from the outer surface of tube 5; the function of said polished surface being similar to that of the silvered inner surface of the outer wall of a vacuum bottle or flask.

Said copper tube 9 may also serve as a riser or conductor for leading current in at the upper end of the thin-walled heater tube 5, through the medium of an interposed metal collar $9^b$ which is silver-soldered to the upper ends of tubes 5 and 9. Tube 9 may have rigidly connected to its lower end by welding, brazing, silver-soldering, or the like, a metal member 10 for electrical connection thereto of one terminal wire 11 of the secondary winding 12 of a welding type transformer, the primary winding 13 of which may have its terminals connected to a suitable constant voltage source of supply, as indicated at $L^1$ and $L^2$. Tube 9 is provided at its lower end with an outwardly projecting annular flange $9^c$ which overlies an annular member 14 of suitable insulating material. The lower surface of member 14 overlies an outwardly projecting annular flange $15^a$ formed upon a short length of expansible metal tubing or bellows 15. A second metal collar $9^b$ is silver-soldered, or otherwise rigidly attached in sealing relation, to the lower end of tube 5 and to the lower end $15^b$ of tubing 15. Insulating member 14 is so attached, in any suitable manner, as to provide a vacuum-tight connection between the lower end of tube 9 and the upper end of tubing 15; which tubing 15 is adapted to compensate for the difference in expansion of the hot inner tube 5 with respect to said outer copper tube 9. A metal member 16 is electrically and mechanically connected to the lower collar $9^b$, to provide for electrical connection of the other terminal wire 17 of said secondary winding 12.

The transformer 12, 13 is preferably of approximately ten kilowatts capacity in a device of the size herein illustrated. However, the average value of energy utilization would be much less than ten kilowatts.

The granular insulating material after heating thereof by passage through tube 5 may fall into any suitable receptacle. As shown diagrammatically in the drawing said receptacle may be in the form of a horizontal cylinder or tube 18 (which will normally be of a diameter at least as great as the diameter of tube 5, to accommodate the properly shaped lower end of the latter). Positioned within cylinder 18 is a piston 19, the operating rod of which is shown at 20. The operating means (not shown) for rod 20 is preferably of such character that piston 19 will be operated rapidly a number of times to gradually lessening degrees during the time interval required for a charge to enter cylinder 18, these light pressure strokes serving to compact the material at the extrusion end of said cylinder, as indicated at 21 and 22, to effect densification of the partial charges; one of which is indicated by numeral 23. When the complete charge has been metered into cylinder 18 and compressed in sections at the aforementioned extrusion end thereof, a power stroke will be applied to piston 19 to cause the hot and partially compacted material to be extruded into the die. The die 24, 25 may be part of a turret type machine, designated in general by numeral 26, so that after the power stroke of the piston the die can be backed away and the machine rotated through a predetermined angle, by a suitable arrangement of gearing, not shown, to provide for bringing of a different die into proper position with respect to cylinder 18; whereupon the intermittent compacting and final extrusion or molding operations are repeated.

In this manner, substantially any desired curing time can be provided, inasmuch as each die upon the turret need not be opened until just before it is to be used again, when it comes around in its cycle.

Although I have shown the utility of my heating system in respect of discontinuous molding, it is likewise obvious that the same is adaptable for use in continuous molding; as, for instance, in the extrusion of plastic tubing, or in the extrusion of plastic shapes in general. Such extrusion might be effected by the single cylinder and piston arrangement illustrated, but with each stroke of the piston a power stroke; or it might be effected by employing a plurality of pistons and cylinders, with a suitable valve in the throat of the extruder. Also the ordinary arrangement involving use of a worm type feed might be employed to provide the necessary degree of compression of the heated plastic material at the throat of the extruder.

If it be assumed that the tube 5 is heated to about 1000 degrees F., the granular molding material of rice size, in falling therethrough for a distance of approximately sixteen feet (the duration of fall being slightly more than one second, as aforestated) will acquire a temperature which, when finally equalized throughout the mass in cylinder 18 or the like, will approximate 400 degrees F.; at which temperature transfer molding of said granular insulating material may be readily and properly effected.

Outer tube 9 is provided with a circular opening $9^d$ to accommodate the outwardly projecting tubular portion $27^a$ of a metal member or nipple, whose flanged inner end $27^b$ is welded, brazed or otherwise rigidly attached in sealed relationship to the inner surface of tube 9. Portion $27^a$ may be connected with a vacuum pump (not shown) of any suitable type, through the medium of a hose or similar conduit, a fragment of which is shown at 28. Hose 28 may be retained in proper relationship to portion $27^a$ by means of a known form of metal clamp 29, whose clamping bolt or screw is designated by numeral 30. A vacuum complete enough to be a thermal insulator is maintained in the space between tubes 5 and 9.

As aforeindicated, the molding material as fed from hopper 7 is pre-granulated, and, for obvious reasons, the same should be dust-free. Machines for producing dust-free granular molding material are commercially available, and machines of such character are largely used by manufacturers of chemicals.

The temperature of 1000 degrees F. for the inner tube 5 is merely set forth by way of an example. The same is true of the temperature of approximately 400 degrees F. attained by the granular molding material. Thus it is to be understood that the actual temperature of the granular molding material upon passage thereof through inner tube 5, when heated to a given degree, will depend upon the initial temperature of such material, the size of the granules, the percentage of volatile ingredients in the material, the nature of such volatile ingredients (that is to say, the heat of vaporization of the volatile ingredients), and the specific heat, thermal conductivity, rate of discharge of the material from hopper 7, etc.

The heating of the granular molding material as herein disclosed might be combined with preheating of such material in bulk, preferably in a tumbling drum, to a temperature at which slow thermosetting begins. This would increase the capacity and efficiency of the device herein disclosed with respect to accomplishment of the results contemplated by me.

It will be apparent to those skilled in the art that the structural details of the illustrated device may be modified in various respects within the scope of my invention as defined by the appended claims.

I claim:

1. In a device for treating substantially dust-free, pre-granulated thermoplastic and thermosetting molding material, in combination, a seamless, vertical tubular relatively thin metal member having a high temperature coefficient of resistance, said resistance member having a length of about sixteen feet, said resistance member having a laterally confined column of air therein, a relatively heavy gauge copper tube surrounding said resistance member throughout the major portion of the length thereof, a relatively short length of metal bellows alined with and attached to but insulated from said copper tube at one end of the latter, means comprising a metal member affording a sealing connection between one end of said resistance member and said copper tube and a second metal member affording a sealing connection between the other end of said resistance member and the free end of said bellows, means including said metal sealing members for electrically connecting opposite ends of said resistance member to the respective ends of the secondary winding of a transformer, the primary winding of said transformer being connected to a suitable source of current supply whereby said member may be heated to a temperature of about 1000 degrees F., and means providing a free gravity flow of a thin stream of such molding material through said resistance member and said column of air in the latter whereby the molding material is heated to a temperature of about 400 degrees F. just prior to feeding thereof to a transfer molding machine.

2. In a device for treating substantially dust-free, pre-granulated thermoplastic and thermosetting molding material, in combination, a seamless, vertical tubular relatively thin metal member having a high temperature coefficient of resistance, said resistance member having a length of about sixteen feet, said resistance member having a laterally confined column of air therein, a relatively heavy gauge copper tube surrounding said resistance member throughout the major portion of the length thereof, a relatively short length of metal bellows alined with and attached to but insulated from said copper tube at one end of the latter, means comprising a metal member affording a sealing connection between one end of said resistance member and said copper tube and a second metal member affording a sealing connection between the other end of said resistance member and the free end of said bellows, means including said metal sealing members for electrically connecting opposite ends of said resistance member to the respective ends of the secondary winding of a transformer, the primary winding of said transformer being connected to a suitable source of current supply whereby said resistance member may be heated to a temperature of about 1000 degrees F., means providing a free gravity flow of a thin stream of such molding material through said resistance member and said column of air in the latter whereby the molding material is heated to a temperature of about 400 degrees F. just prior to feeding thereof to a transfer molding machine, and associated power-operated means for effecting such feeding of said material.

3. In a device for treating substantially dust-free, pre-granulated thermoplastic and thermosetting molding material, in combination, a seamless, vertical tubular relatively thin metal member having a high temperature coefficient of resistance, said resistance member having a length of about sixteen feet, said resistance member having a laterally confined column of air therein, a relatively heavy gauge seamless copper tube surrounding said resistance member throughout the major portion of its length, the inner surface of said copper tube being relatively highly polished, a relatively short length of metal bellows alined with and attached to but insulated from said copper tube at one end of the latter, means comprising a metal collar affording a sealing connection between one end of said resistance member and said copper tube and a second metal collar affording a sealing connection between the other end of said resistance member and the free end of said bellows, means including said collars for electrically connecting opposite ends of said resistance member to the respective ends of the secondary winding of a transformer, the primary winding of said transformer being connected to a suitable source of current supply whereby said resistance member may be heated to a temperture of about 1000 degrees F., and means providing a free gravity flow of a thin stream of approximately rice-size granules of said molding material through said resistance member and said column of air in the latter whereby the molding material is heated to a temperture of about 400 degrees F. just prior to feeding thereof to a transfer molding machine.

4. In a device for treating substantially dust-free, pre-granulated thermoplastic and thermosetting molding material, in combination, a seamless, vertical tubular relatively thin metal member having a high temperature coefficient of resistance, said resistance member having a length of about sixteen feet, said resistance member having a laterally confined column of air therein, a relatively heavy gauge copper tube surrounding said resistance member throughout the major portion of the length thereof, a relatively short length of metal bellows alined with and attached to but insulated from said copper tube at one end of the latter, means comprising a metal collar affording a sealing connection between one end of said resistance member and said copper tube and a second metal collar affording a sealing connection between the other end of said resistance member and the free end of said bellows, means including said collars for electrically connecting opposite ends of said resistance member to the respective ends of the secondary winding of a transformer, the primary winding of said transformer being connected to a suitable source of current supply whereby said resistance member may be heated to a temperature of about 1000 degrees F., means providing a free gravity flow of a thin stream of said molding material in the form of granules of substantially uniform relatively small size through said resistance member and said column of air in the latter whereby the molding material is heated to a temperature of about 400 degrees F. just prior to feeding thereof to a transfer molding machine, and means comprising an outwardly projecting hollow nipple communicating with the space between said resistance member and said copper tube, whereby said space may be connected with a vacuum pump to provide for creation of a predetermined degree of vacuum therewithin to minimize the loss of heat from the outer surface of said resistance member.

IRVIN W. COX.

REFERENCES CITED

The following references are of record in the file of this patent:

UNITED STATES PATENTS

| Number | Name | Date |
|---|---|---|
| 715,509 | Potter | Dec. 9, 1902 |
| 896,413 | Reid | Aug. 18, 1908 |
| 972,308 | Williamson | Oct. 11, 1910 |
| 1,177,680 | Brown | Apr. 4, 1916 |
| 1,540,401 | Kelly et al. | June 2, 1925 |
| 1,980,825 | Rankin | Nov. 13, 1934 |
| 2,111,857 | Jeffery | Mar. 22, 1938 |
| 2,140,825 | Zuckert | Dec. 20, 1938 |
| 2,252,107 | Weida | Aug. 12, 1941 |
| 2,359,840 | Goessling | Oct. 10, 1944 |